(12) United States Patent
Grigoras et al.

(10) Patent No.: US 9,163,102 B2
(45) Date of Patent: Oct. 20, 2015

(54) SOLUBLE BRANCHED POLYMERS

(71) Applicants: Cristian Grigoras, Suffern, NY (US); Krystyna Plochocka, Scotch Plains, NJ (US); Osama M. Musa, Kinnelon, NJ (US); Jenn Shih, Paramus, NJ (US)

(72) Inventors: Cristian Grigoras, Suffern, NY (US); Krystyna Plochocka, Scotch Plains, NJ (US); Osama M. Musa, Kinnelon, NJ (US); Jenn Shih, Paramus, NJ (US)

(73) Assignee: ISP INVESTMENTS INC., Wilmington, DE (US)

( * ) Notice: Subject to any disclaimer, the term of this patent is extended or adjusted under 35 U.S.C. 154(b) by 0 days.

(21) Appl. No.: 14/353,553

(22) PCT Filed: Nov. 30, 2012

(86) PCT No.: PCT/US2012/067193
§ 371 (c)(1),
(2) Date: Apr. 23, 2014

(87) PCT Pub. No.: WO2013/082359
PCT Pub. Date: Jun. 6, 2013

(65) Prior Publication Data
US 2014/0303313 A1  Oct. 9, 2014

Related U.S. Application Data

(60) Provisional application No. 61/565,656, filed on Dec. 1, 2011.

(51) Int. Cl.
| | |
|---|---|
| *C08F 220/08* | (2006.01) |
| *C08F 226/10* | (2006.01) |
| *C08F 110/10* | (2006.01) |
| *C08F 216/14* | (2006.01) |
| *C08F 222/06* | (2006.01) |
| *C08F 226/06* | (2006.01) |
| *C08F 216/18* | (2006.01) |

(52) U.S. Cl.
CPC ............ *C08F 220/08* (2013.01); *C08F 110/10* (2013.01); *C08F 216/14* (2013.01); *C08F 216/18* (2013.01); *C08F 222/06* (2013.01); *C08F 226/06* (2013.01); *C08F 226/10* (2013.01); *C08F 2810/20* (2013.01)

(58) Field of Classification Search
CPC .. C08F 2220/06; C08F 222/40; C08F 226/06; C08F 226/10; C08F 110/10
See application file for complete search history.

(56) References Cited

U.S. PATENT DOCUMENTS

| | | | |
|---|---|---|---|
| 5,139,770 A | | 8/1992 | Shih et al. |
| 5,321,110 A | * | 6/1994 | Shih .............................. 526/264 |
| 5,385,729 A | | 1/1995 | Prencipe et al. |
| 5,635,169 A | * | 6/1997 | Blankenburg et al. ..... 424/70.15 |

(Continued)

OTHER PUBLICATIONS

International Search Report of PCT/US2012/067193 published on Jun. 6, 2013.

*Primary Examiner* — Satya Sastri
(74) *Attorney, Agent, or Firm* — William J. Davis

(57) ABSTRACT

Branched polymers are prepared from at least (A) at least one monomer having an electron donor moiety, (B) at least one monomer having an electron acceptor moiety, and (C) at least one multifunctional branching agent comprising a urea moiety and at least two N-vinyl groups. The branched polymers are least 20% (by weight) soluble in a solvent for which the corresponding polymer of equal molecular weight made without said multifunctional branching agent is at least 20% (by weight) soluble. Due in part to the wide range of chemistries and solubility and rheological properties, the branched polymers find application in personal care, pharmaceutical/nutritional, and performance chemicals compositions.

5 Claims, 4 Drawing Sheets

(56) References Cited

U.S. PATENT DOCUMENTS

| | | |
|---|---|---|
| 2002/0055450 A1 | 5/2002 | Rodrigues |
| 2004/0242796 A1 | 12/2004 | Musa |
| 2007/0141013 A1* | 6/2007 | Nguyen-Kim et al. .... 424/70.15 |
| 2010/0179082 A1 | 7/2010 | Castro et al. |

* cited by examiner

SOLUBLE BRANCHED POLYMERS

BACKGROUND OF THE INVENTION

1. Field of the Invention

The present invention relates to branched polymers, their properties, compositions and uses thereof.

2. Description of Related Art

There is a desire to extend the performance of polymers beyond what is currently known. In many applications polymers that exhibit low viscosity while maintaining benefits of a higher molecular weight are needed. Such polymers could be used in spraying, pumping, and mixing applications that currently are limited by high viscosity. Likewise, there is a demand for polymers that offer better processability (like blendability, mixability, pumpability, and/or extrudability) to enable entirely new formulations that cannot otherwise be created. Examples of limitations may include high equipment torque, motor failure, and/or product inhomogeneity. One approach to this problem is to synthesize branched polymer variants.

Branching agents are compounds that have the functionality to link one monomer and/or polymer chain to another monomer and/or polymer chain, resulting in polymers that are non-linear polymers, or partially crosslinked polymers. The non-linear and/or partially crosslinked polymers may contain linear polymer portion(s), and combinations thereof.

Among other factors, the resulting polymer properties can depend on the selected monomer(s), branching agent(s), their addition levels, resulting polymer chain densities, and polymerization solvent (or solvent blend), if used. Low addition levels of these branching agents can give rise to branched polymer behavior, meaning that the polymer does not exhibit properties typical of polymers made without the branching agent. Branched polymers may exhibit a lower viscosity than linear polymers of equal molecular weight made without the branching agent, an effect attributed in part to fewer polymer chain entanglement arising from the branched polymer architecture. Because they lack extensive covalent bonds between polymer chains (which is achieved at high branching agent addition levels), a branched polymer exhibits a solubility in the same solvents that solubilize the analogous polymer of equal molecular weight but synthesized without the branching agent(s). As just mentioned, with further increases in the branching agent(s), the resulting polymer can display networked hydrogel behavior, which may include elastic properties such as increased elongational viscosity and/or higher strengths. At high addition levels crosslinked polymers may be created, becoming very rigid or glassy, such as phenol-formaldehyde materials.

It is known to those skilled in the art that polymers having the same chemical composition but having different branching may have different properties. See, for general background, F. W. Billmeyer, Textbook of Polymer Science, 3rd Ed., John Wiley and Sons, New York, 1984; P. J. Flory, Principles of Polymer Chemistry, Cornell University Press, 1953; and C. Tanford, Physical Chemistry of Macromolecules, John Wiley and Sons, New York, 1961.

Related disclosures include WO 2007/096400, WO 2008/032342, and U.S. Pat. Nos. 5,300,606; 5,338,815; 5,534,174 and 5,788,950.

Disclosures of branched polymers, especially poly(N-vinyl-2-pyrrolidone), are provided in U.S. Pat. Nos. 5,082,910; 5,159,034; and 6,294,064. The '910 and '034 inventions provide processes for preparing linear polymers of high molecular weight, as contrasted to branched polymers of low molecular weight. Also known are poly(N-vinyl-2-pyrrolidone)-b-polyester, as disclosed on U.S. patent application 2008/0262105. An additional description of branched polymers includes co-pending U.S. patent application Ser. No. 12/984,926.

Related disclosure also includes international patent application PCT/US11/20208, which is hereby incorporated in its entirety by reference. That application provides polymers resulting from the polymerization of at least one reactive vinyl monomer moiety and a multifunctional N-vinyl formamide crosslinking moiety.

Also related are the following U.S. Pat. Nos. 4,774,285; 4,952,558; 5,202,112; 5,334,375; 5,385,729; 5,534,174; and 5,569,725; 6,197,908; 6,252,026; 7,135,598; 7,579,403; 7,833,585; 7,498,395; and U.S. patent applications 2006/0116492 and 2010/00144958; and international application WO 1992/015628 and 2010/149957

SUMMARY OF THE INVENTION

The invention provides branched polymers polymerized from (A) at least one monomer having an electron donor moiety, (B) at least one monomer having an electron acceptor moiety, and (C) at least one multifunctional branching agent comprising a urea moiety and at least two N-vinyl groups. These polymers exhibit a solubility, oscillatory rheology, and/or shear rheology property that differentiates them from fully linearly or fully crosslinked polymers.

Also provided are the uses of these polymers in various personal care, pharmaceutical/nutritional, and performance chemicals compositions.

DETAILED DESCRIPTION

Figure 1:
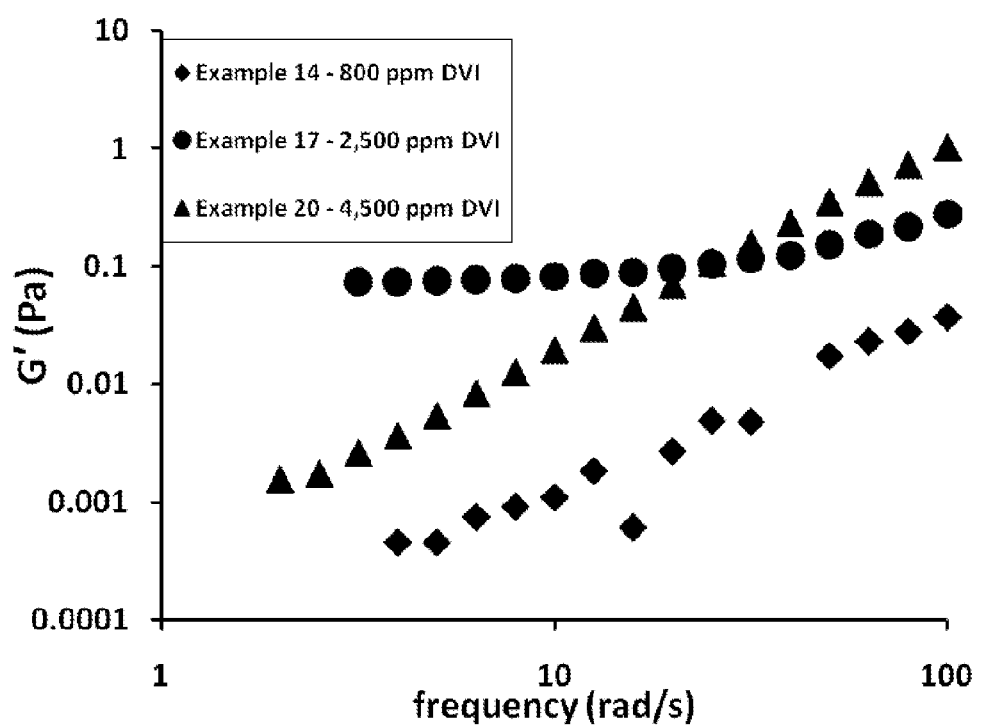
FIG. 1 is a graph of G' as a function of frequency measured in accordance with Example 27.

The invention provides branched polymers that show properties unlike their unbranched counterparts, or their fully crosslinked analogues. The reader understands these embodiments and particulars used to describe them do not limit the scope of the invention.

The branched polymers result from a polymerization comprising: (A) at least one monomer having an electron donor moiety, (B) at least one monomer having an electron acceptor moiety, and (C) at least one multifunctional branching agent comprising a urea moiety and at least two N-vinyl groups.

In one embodiment the branched polymer is at least 20% (by weight) soluble in a solvent for which the corresponding polymer of equal molecular weight made without the multifunctional branching agent is at least 20% (by weight) soluble. In other embodiments the storage modulus, G', and the loss modulus, G", are not independent of frequency. In other embodiments the ratio of G' divided by G" (tan δ) is greater than 1. In yet other embodiments, branched polymers exhibit lower shear viscosity, enhanced processability, lower elongational viscosity, and/or improved sprayability compared to a corresponding polymer of equal molecular weight synthesized without branching agent.

Also provided are formulations that may advantageously utilize the branched polymers' properties. Examples of these formulations include adhesives, aerosols, agricultural compositions, beverages, cleaning compositions, coating compositions, dental compositions, detergents, drugs, encapsulations, foods, hair sprays, lithographic solutions, membrane formulations, oilfield formulations, personal care compositions, pharmaceuticals, pigment dispersions, and the like. Personal care compositions refers to such illustrative non-limiting compositions as skin, sun, hair, oral, cosmetic, and preservative compositions, including those to alter the color and appearance of the skin. Other personal care compositions include, but are not limited to, polymers for increased flexibility in styling, durable styling, increased humidity resistance for hair, skin, and color cosmetics, sun care waterproof/resistance, wear-resistance, and thermal protecting/enhancing compositions. Dental personal care compositions include denture adhesives, toothpastes, mouthwashes, chewing gums, tooth whiteners, stain removers, and the like that can deliver an active ingredient (such as an anti-gingivitis active and/or a breath freshening active). Pharmaceutical compositions include tablet coatings, tablet binders, transdermal patches, and the like.

Before describing further non-limiting details regarding the polymers, compositions, and methods, the following terms are provided:

The term "branched polymer" refers to any polymer that is not completely linear nor completely crosslinked, wherein either the non-linear and/or partially crosslinked polymer may contain linear polymer portion(s), and combinations thereof. The term "branched polymer" does not refer to a 100% completely linear polymer or a 100% crosslinked polymer. Categories of polymers included within the term "branched" include branched, hyperbranched, comb, and dendritic. In certain embodiments, these branched polymers are at least 20% (by weight) soluble in the same solvent that solubilizes at least 20% (by weight) of the corresponding polymer of equal molecular weight made without the branching agent. Other embodiments recognize that branched polymers may exhibit lower viscosity, enhanced processability, and/or improved sprayability compared to the aforementioned linear polymer of equal molecular weight synthesized without the branching agent. In yet other embodiments, the branched polymers may exhibit a frequency-dependent storage modulus (G'), a frequency-dependent loss modulus (G''), and/or a ratio of G'/G'' (tan δ) that is equal to or greater than 1.

The term "(meth)acrylate" refers to both acrylate and methacrylate. Similarly, the term "(meth)acrylamide" refers to both acrylamide and (meth)acrylamide.

The term "polymer" refers to a large molecule (macromolecule) comprising repeating structural units (monomers) connected by covalent chemical bonds.

The term "personal care composition" refers to a composition intended for use on or in the human body and may be an oral care composition, a hair care composition, a hair styling composition, a face care composition, a lip care composition, an eye care composition, a foot care composition, a nail care composition, a sun care composition, a deodorant composition, an antiperspirant composition, a cosmetic composition (including color cosmetics), a skin cleaning composition, an insect repellant composition, a shaving composition, a toothpaste, a mouthwash, a tooth whitener, a tooth stain remover, and/or a hygiene composition. Among their many uses, hair care and hair styling compositions find application in enhancing hair shine, cleansing hair, conditioning hair, repairing split ends, enhancing hair manageability, modulating hair stylability, protecting hair from thermal damage, imparting humidity resistance to hair and hair styles, promoting hair style durability, changing the hair color, straightening and/or relaxing hair, and/or providing protection from UV-A and/or UV-B radiation. Other personal care compositions, such as those for skin care and sun care compositions, are useful for protecting from UV-A and/or UV-B radiation, imparting water resistance or water proofness, moisturizing skin, decreasing and/or minimizing the appearance of wrinkles, firming skin, decreasing or minimizing the appearance of skin blemishes (such as lentigo, skin discolorations, pimples, or acne), changing skin color (such as color cosmetics for the face, cheeks, eyelids, or eye lashes). Oral care compositions according to the invention may be used as denture adhesives, toothpastes, mouthwashes, tooth whiteners, and/or stain removers. Personal care compositions also are used for delivering an active (such as to the skin, hair, or oral cavity).

The term "pharmaceutical/nutritional composition" refers to any composition that comprises one or more chemical agents that elicit a response from a mammal (such as man, horse, dog, cat) when administered by topical, oral, sublingual, intravenous, subcutaneous, anal, or vaginal routes. These chemical agents may be natural or synthetic, of any purity, and may be the active agent itself or a form subsequently converted to the active agent. Non-limiting examples include prescriptive medications, over the counter (OTC) medications, nutritional supplements, dietary supplements, and vitamins, and may have the product format of a tablet, caplet, softgel, chewable, multi-particulate capsule, powder, cream, lotion, ointment, paste, solution, dispersion, emulsion, gel, shampoo, rinse, dip, wipe, or injectable.

The term "performance chemicals composition" refers to compositions that are not personal care compositions nor pharmaceutical/nutritional compositions. Performance chemicals compositions serve a broad variety of applications, non-limiting examples of which include: adhesives, agricultural, biocides, veterinary, coatings, electronics, household-industrial-institutional (HI&I), inks, membranes, metal fluids, oilfield, paper, paints, plastics, printing, plasters, textiles, fuels, lubricants, home care, and wood care compositions.

Polymers

Provided herein are branched polymers that exhibit distinct properties compared to those known in the art. The polymers are branched polymers that are not completely linear nor completely crosslinked polymers, and that retain a solubility in a solvent for which the corresponding polymer of equal molecular weight made without the branching agent also is soluble. The invention relates to branched "donor-acceptor" polymers produced from a synthesis comprising: (A) at least one monomer having an electron donor moiety, (B) at least one monomer having an electron acceptor moiety, and (C) at least one multifunctional branching agent comprising a urea moiety and at least two N-vinyl groups. These polymers offer unique rheological properties that are unlike their completely linear and completely crosslinked counterparts. The invention further embraces polymers having additional monomer(s), and a method of polymerization. A description of these synthesis components now will be provided.

The first polymerizable species is (A) at least one monomer having an electron donor moiety. These monomers typically have one or more moieties adjacent to the vinyl group contributing electrons to it. Examples of such monomers include vinyl ethers, vinyl amides, vinyl acetates, vinyl carbonates, allyls, compounds containing carbon to carbon double bonds attached to an aromatic ring and conjugated with the unsaturation in the aromatic ring such as compounds derived from cinnamyl and styrenic starting compounds, olefins, vinyl carbamates, vinyl thiocarbamates, vinyl imidazoles, vinyl pyridines, vinyl ureas, vinyl halides, and vinyl silanes.

Non-limiting examples of vinyl ethers include: methyl vinyl ether; ethyl vinyl ether; iso-propyl vinyl ether; n-propyl vinyl ether; n-butyl vinyl ether; iso-butyl vinyl ether; tert-butyl vinyl ether; 2-ethylhexyl vinyl ether; n-octyl vinyl ether; n-dodecyl vinyl ether; ethyl vinyl ether; isopropenyl methyl ether; 1-butyl vinyl ether; hydroxybutyl vinyl ether; 1,4-cyclohexane-dimethanol monovinyl ether; methoxyethyl vinyl ether; methoxyethoxyethyl vinyl ether; the monomethyl ether of triethylene glycol vinyl ether; and combinations thereof.

The vinyl amide may be cyclic or acyclic. Examples of cyclic vinyl amides include, but are not limited to: N-vinyl-2-pyrrolidone, N-vinyl-2-caprolactam, N-vinyl-2-piperidone, and combinations thereof; as well as their alkylated analogues, such as N-vinyl-3-methyl pyrrolidone; N-vinyl-4-methyl pyrrolidone; N-vinyl-5-methyl pyrrolidone; N-vinyl-3-ethyl pyrrolidone; N-vinyl-3-butyl pyrrolidone; N-vinyl-3,3-dimethyl pyrrolidone; N-vinyl-4,5-dimethyl pyrrolidone; N-vinyl-5,5-dimethyl pyrrolidone; N-vinyl-3,3,5-trimethyl pyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam and combinations thereof.

Examples of acyclic vinyl amide moieties include, but are not limited to: N-vinyl formamide and N-vinyl acetamide; N-propenylacetamide; N-(2-methylpropenyl) acetamide; N-vinyl formamide; N-(2,2-dichloro-vinyl)-propionamide; N-ethenyl acetamide; N-vinyl-N-methyl acetamide; N-vinyl-N,N-propyl propionamide; and combinations thereof.

Non-limiting examples of vinyl acetates include: vinyl acetate, vinyl formate, isopropenyl formate, ethenyl propynoate, isopropenyl acetate, vinyl propionate, 1-propenyl acetate, isopropenyl fluoroformate, chlorovinyl formate, 2-chlorovinyl acetate, and combinations thereof.

Non-limiting examples of vinyl carbonates include: ethylene carbonate, methyl vinyl carbonate, vinyl ethyl carbonate, isopropenyl methyl carbonate, ethyl isopropenyl carbonate, vinyl isopropyl carbonate, crotyl ethyl carbonate, vinyl ethylene glycol carbonate, n-butyl vinyl carbonate, 3-hydroxypropyl vinyl carbonate, vinyl phenyl carbonate, vinyl chlorocarbonate, and combinations thereof.

Non-limiting examples of styrenes include: styrene; α-methyl styrene; alkylated styrenes such as 2-methyl styrene, 3-methyl 4-methyl styrene, and 1-ethyl-3-vinyl styrene; halogenated styrenes such as 2-fluorostyrene, 3-fluorostyrene, and their chlorine analogues; styrenes having one or more amino groups such as 2-vinyl aniline, 3-vinyl aniline, and 4-vinyl aniline; styrenes having one or more hydroxyl groups such as 2-hydroxy styrene, 3-hydroxy styrene, and 4-hydroxy styrene; and combinations thereof.

Non-limiting examples of cinnamyls include: cinnamyl; 2-methyl styrene; 2-phenylethyleneamine; styrylsilane; cinnamyl mercaptan; 2-chlorovinyl benzene; 2,4,6-trimethyl-3-(2-methyl-propenyl)-aniline; pentamethyl-propenyl-benzene; and 4-propenyl-2,6-dimethylphenol; and combinations thereof.

Non-limiting examples of vinyl carbamates include vinyl carbamate (vinyl urethane); vinyl N-methyl carbamate; vinyl N,N-dimethyl carbamate; 2-hydroxyethyl vinyl carbamate; vinyl N,N-diethyl carbamate; vinyl N-cyclohexyl carbamate; isopropenyl phenylcarbamate; and combinations thereof.

Non-limiting examples of vinyl thiocarbamates include vinyl thiocarbamate, vinyl N-methyl thiocarbamate; vinyl N,N-dimethyl thiocarbamate; 2-hydroxyethyl vinyl thiocarbamate; vinyl N,N-diethyl thiocarbamate; vinyl N-cyclohexyl thiocarbamate; isopropenyl phenyl thiocarbamate; and combinations thereof.

Non-limiting examples of vinyl imidazole include N-vinyl imidazole, N-vinyl-2-methyl imidazole, N-vinyl-4-methylimidazole; N-isopropenyl imidazole, N-vinyl-2,4-dimethyl imidazole, N-vinyl-2-ethyl imidazole, 2-methyl-1-vinyl imidazole, 1-isopropenyl-2-methyl imidazole, N-vinyl-2-methylamine imidazole, 1-vinyl-2-hydroxymethyl imidazole, N-vinyl-5-hydroxyethyl imidazole, N-vinyl-4-hydroxyethyl imidazole, and combinations thereof.

Non-limiting examples of vinyl pyridines include 2-vinyl pyridine, 2-propenyl pyridine, 4-methyl-2-vinyl pyridine, 2-isopropenyl pyridine, 6-methyl-2-vinyl pyridine, 4-methyl-2-vinyl pyridine, 5-methyl-2-vinyl pyridine, 3-methyl-2-vinyl pyridine, 3-hydroxy-2-vinyl pyridine, 2-vinyl quinoline, as well as the corresponding 3-vinyl pyridine 4-vinyl pyridine analogues thereof, and combinations thereof.

Non-limiting examples of vinyl ureas include N-vinyl urea, isopropenyl urea, (1-ethyl-vinyl)-urea, N-ethyl-N'-vinyl urea, N-methyl-N'-vinyl urea, N,N-dimethyl-N'-vinyl urea, N-vinyl-N'-vinyl urea, and combinations thereof.

Non-limiting examples of vinyl halide include vinyl fluoride, vinyl chloride, and combinations thereof.

Non-limiting examples of allyls include allyl halides, isobutylene, propene, 1,3-butadiene, isobutene, 1-pentene, and combinations thereof.

Non-limiting examples of vinyl silanes include trimethylsilyl ethylene, vinyl silane, ethyl vinyl silane, tripropyl vinyl silane, vinyl tris(2-methoxyethoxy)silane, diethyl vinyl silane, methyl vinyl silane, methyl vinyl dihydroxysilane, and combinations thereof.

The second polymerizable species is (B) at least one monomer having an electron-poor vinyl moiety. Examples of (B) monomers include anhydrides, anhydrides, (meth)acrylates, (meth)acrylamides, fumarates, maleates, and maleimides.

Non-limiting examples of anhydrides include maleic anhydride, itaconic anhydride, citraconic anhydride, and combinations thereof.

Many examples of (meth)acrylates are known, commercially available, or polymerizable for use in the invention. Non-limiting examples of (meth)acrylate include: (meth)acrylate, methyl (meth)acrylate, ethyl (meth)acrylate, butyl (meth)acrylate, n-octyl (meth)acrylate, ethyl hexyl (meth)acrylate, dodecyl (meth)acrylate, stearyl (meth)acrylate, lauryl (meth)acrylate, glycidyl (meth)acrylate, isobornyl (meth)acrylate, and combinations thereof. Commercially available (meth)acrylates include those compounds for sale by Sartomer, a group of Arkema Inc.

The (meth)acrylamide may be cyclic or acyclic. Examples of cyclic (meth)acrylamide moieties include, but are not limited to: N-acryloyl pyrrolidone; N-acryloyl caprolactam; N-acryloyl piperidone; ethyl acryloyl pyrrolidone; methyl acryloyl pyrrolidone; ethyl acryloyl caprolactam; and methyl acryloyl caprolactam. Examples of acyclic acrylamide moieties include, but are not limited to: (meth)acrylamide;

N-ethyl (meth)acrylamide; isopropyl (meth)acrylamide; N,N-diethyl (meth)acrylamide; N-cyclohexyl (meth)acrylamide, N-cyclopentyl (meth)acrylamide; N-butoxymethyl (meth)acrylamide; N,N-dibutyl (meth)acrylamide; N-butyl (meth)acrylamide; diacetone (meth)acrylamide; N—(N,N-dimethylamino)ethyl (meth)acrylamide; N,N-diethyl (meth)acrylamide; N,N-dimethyl (meth)acrylamide; N-dodecyl (meth)acrylamide; N-ethyl (meth)acrylamide; N-ethyl (meth)acrylamide; N-isopropyl (meth)acrylamide; N-isopropyl (meth)acrylamide; ββ-N,N-tetramethyl (meth)acrylamide; N-methylol (meth)acrylamide; N-methyl (meth)acrylamide; N-octadecyl (meth)acrylamide; N-n-octyl (meth)acrylamide; N-tert-octyl (meth)acrylamide; N-phenyl (meth)acrylamide; and trichloro (meth)acrylamide.

Non-limiting examples of fumarates and maleates include: fumarate; maleate; 2-methyl maleic acid; monomethyl maleate; monomethyl fumarate; dimethyl maleate; dimethyl fumarate; ethyl maleate; ethyl fumarate; 2,3-dimethyl maleate; 2,3-dimethyl fumarate; ethyl 2-hydroxyethyl maleate; ethyl 2-hydroxyethyl fumarate; and combinations thereof.

Non-limiting examples of maleimides include: maleimide; 1,3-dimethyl maleimide; N-ethyl maleimide; N-hydroxymethyl maleimide; N-methoxy maleimide; N-chloromaleimide; N-isopropyl maleimide; N-propyl maleimide; N-tert-butyl maleimide; N-n-octyl maleimide; N-tert-octyl maleimide; N-phenyl maleimide; and combinations thereof.

In addition to at least one (A) monomer having an electron donor moiety, and at least one (B) monomer having an electron acceptor moiety, branched polymers of the invention also comprise (C) at least one multifunctional branching agent comprising a urea moiety and at least two N-vinyl groups. The multifunctional branching agent produces branched polymers that retain solubility in solvents for which polymers made without the branching agent are soluble.

The multifunctional branching agent comprising a di-N-vinyl urea moiety may be any compound represented by the structure:

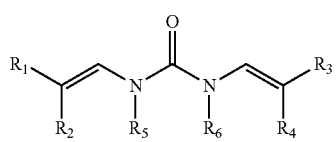

wherein each $R_1$, $R_2$, $R_3$, and $R_4$ is independently selected from the group consisting of hydrogen, functionalized and unfunctionalized alkyl, halogen, and combinations thereof, wherein any of the aforementioned groups may be with or without one or more heteroatoms, and combinations thereof, and $R_5$ and $R_6$ are independently selected from the group consisting of hydrogen, functionalized and unfunctionalized alkyl, alkoxy, cycloalkyl, alkenyl, cycloalkenyl, and aryl groups, and combinations thereof, wherein any of the aforementioned groups may be with or without one or more heteroatoms.

The multifunctional branching agent may be symmetrical or non-symmetrical, may comprise one or more cyclic structures, or may be acyclic. For example, $R_5$ and $R_6$ may form a ring, such as the non-limiting compounds summarized in Table 1.

TABLE 1

Non-limiting examples of cyclic branching agents

| compound name | structure | reference |
|---|---|---|
| 1,3-divinyl imidazolidin-2-one ("DVI") | | |
| 1,3-divinyl benzimidazolin-2-one (CAS Number: 6648-13-1) | | Diez-Barra, E., et al., Tetrahedron, 1997, vol. 53, #22 p. 7689-7704 |
| 1,3-di-N-vinyluracil (CAS Number: 114914-09-9) | | Dalpozzo, R., et al., Synthesis, 2002, 2 p. 172-174 |
| 1,3,5-trivinyl-[1,3,5]triazine-2,4,6-(1H, 3H, 5H)-trione (CAS Number: 6504-96-7) | | Prager, R. H.; Were, S. T., Australian Journal of Chemistry, 1991, vol. 44, #11 p. 1635-1641 |
| 1,3-divinyl-4,5-diphenylimidazol-2-one (CAS Number: 120834-33-5) | | Trzhtsinskaya, B. V.; et al., Bulletin of the Academy of Sciences of the USSR, Division of Chemical Science (Englis Translation), 1988, vol. 37, p. 1683-1686 |
| 1,3-divinyl-4methyl-imidazolidin-2-one (CAS Number: 71627-16-2) | | U.S. Pat. No. 5,739,398 |
| 1-phenyl-3,5-divinyl-[1,3,5]triazinane-2,4,6-trione (CAS Number: 6507-22-8) | | |

TABLE 1-continued

Non-limiting examples of cyclic branching agents

| compound name | structure | reference |
|---|---|---|
| 1,3-divinyl-imidazolidin-2,4,5-trione (CAS Number: 91746-85-9) | | |

Alternatively, the multifunctional branching agent may be acyclic, such as the non-limiting examples shown in Table 2.

TABLE 2

Non-limiting examples of non-cyclic branching agents

| compound name | structure | reference |
|---|---|---|
| N,N'-divinyl urea | | |
| N,N,N',N'-tetravinyl urea | | Nefedov, B. K. et al., Bulletin of the Academy of Sciences of the USSR, Division of Chemical Science (English Translation), 1975, vol. 24, p. 1673-1676. |

Polymer Properties

It is recognized that the branched polymers may have varying amounts of at least one (A) monomer having an electron-rich vinyl moiety ("donor"), at least one (B) monomer having an electron-poor vinyl moiety ("acceptor"), and (C) at least one multifunctional branching agent comprising a di-N-vinyl urea moiety. It is impossible, however, to define a priori absolute, specific ranges in these amounts, as the invention embraces branched polymers exhibiting at least one property which distinguishes the invention's polymers over the prior art. In this section the polymer properties first are described so that the addition levels of the (A) and (B) monomers and the (c) multifunctional branching agent can be better understood.

In one aspect, polymers according to the invention are those that are at least 20% (by weight) soluble in a solvent for which the corresponding polymer without the branching agent also is at least 20% (by weight) soluble. In a different aspect, the polymers have a frequency-dependent storage modulus G', a frequency-dependent loss modulus G", or both frequency-dependent G' and G" over the range from about 1 rad/s to about 100 rad/s. In yet another aspect of the invention, the ratio of G'/G", tan δ, is equal to or greater than 1 from about 1 rad/s to about 100 rad/s.

These properties depends, in part, on the types of selected "donor" and "acceptor" monomers, their ratios, the branching agent(s), and the polymerization solvent(s).

First of these properties is the branched polymers' solubility, as they retain a solubility in a solvent for which the corresponding polymer of the same molecular weight made without the branched agent also is soluble. More specifically, the branched polymers are at least 20% (w/w) soluble, meaning they may contain up to 80% (w/w) content that does not fully solubilize. More particularly, the branched polymers are at least 50% soluble, and even more particularly, they are at least 80% soluble. The term "soluble" refers to a condition wherein the polymer-solvent interactions exceed polymer-polymer interactions.

Guidance in defining polymer solubility is provided by the expansion coefficient (α):

$$\alpha = \frac{(\overline{S}^2)^{1/2}}{(\overline{S}_0^2)^{1/2}} \tag{1}$$

wherein $\overline{S}^2$ is the square-average radius of gyration about the center of gravity, and $\overline{S}_0^2$ is the corresponding unperturbed dimension when measured in a theta-solvent. Polymer solubility is provided when α is equal to or greater than unity, precipitation is provided when α is less than unity. Light scattering methods, (e.g., Triple Detector Array by Viscotek Corp.), can be used to determine the variables expressed in equation 1. Factors that influence polymer and solvent (or solvent blend) interactions include temperature, pressure, and low molecular weight compounds.

Another method to quantify solubility is the mass recovery for a sample following gel permeation chromatography analysis (GPC). In this analytical method, insoluble content (which may be gelled polymer) may be removed by the pre-filter, which is typically a 0.45 μm hydrophilic polyvinylidene fluoride (PVDF) filter, or the insoluble content may be retained in the GPC column. A calculation of mass recovery following GPC analysis can be used to express the soluble content of the polymer. The Examples provide more information on measuring the mass recovery (soluble portion) of the branched polymers.

Additional distinctions are the branched polymers' oscillatory rheological properties, more specifically, the storage modulus (G'), loss modulus (G"), and the ratio of G'/G" (tan δ) over the range of 1 rad/s to 100 rad/s. Due in part to their solubility characteristics, the branched polymers exhibit a lower G' than known, related polymers of the same molecular weight. This property is consistent with the view that the branched polymers exhibit a less crosslinked nature than corresponding crosslinked polymers. The Examples illustrate this property, wherein branched polymer are shown to have a value of G' as low as 0.1, 0.01, 0.001, or even approaching 0.0001 Pa.

Furthermore, G', G", or both G' and G" may demonstrate a dependency on the applied oscillatory frequency, meaning that the range of G' or G" varies more than 1 order of magnitude from 1 to 100 rad/s.

Another feature of the branched polymers is tan δ, which, in general, is equal to or greater than unity from 1 to 100 rad/s. It is understood that because G', G", or both G' and G" may be dependent on the applied frequency, tan δ need not always be greater than 1 over the entire range of applied frequency. Branched polymers of the invention include those for which tan δ is equal to or greater than 1 for at least 50% of the frequency range in from 1 to about 100 rad/s. In one particular aspect, tan δ is equal to or greater than 1 for all frequencies from 1 to 100 rad/s.

Another quality of the branched polymers are their shear viscosities, which, in general, are less than the shear viscosities of a corresponding linear polymer of the same molecular weight made without the branching agent and at the same concentration in the same solvent. The term "shear viscosity" regards the resistance to flow experienced by a sample due to an applied shear stress, which may be measured in the laboratory by equipment such as a Brookfield Viscometer (rotational shear) or a capillary viscometer. The Examples illustrate that the branched polymers provide lower Brookfield and capillary viscosities than the linear, control polymer.

By virtue of lower viscosity, the branched polymers may exhibit enhanced processability (such as lower torque on mixing), and/or improved sprayability compared to a corresponding linear polymer of equal molecular weight synthesized without the branching agent. Lower viscosity and enhanced processability may correlate to better blending, distributing, and/or homogenizing with co-ingredients in a formulation.

Given this understanding of the branched polymer properties, it is appreciated that the invention embraces wide ranges in the addition levels of the (A) and (B) monomers and the (C) multifunctional branching agent comprising a di-N-vinyl urea moiety. Polymers may be tested by one skilled in the art to determine if they conform to the teachings provided herein. To provide non-limiting guidance, the polymers generally may comprise:

any non-zero amount of the branching agent to about 14,000 ppm of the branching agent, and the balance of the polymer being from about 1%:99% to about 99%:1% of the (A) acceptor monomer(s):(B) donor monomer(s) (all on a w/w basis), more particularly from about 100 ppm to about 12,000 ppm of the branching agent, and the balance of the polymer being from about 20%:80% to about 80%:20% of the (A) acceptor monomer(s):(B) donor monomer(s) (all on a w/w basis), and even more particularly from about 250 ppm to about 9,000 ppm of the branching agent, and the balance of the polymer being from about 30%:70% to about 70%:30% of the (A) acceptor monomer(s):(B) donor monomer(s) (all on a w/w basis).

The branched polymers may have any range of molecular weight, including very low weights such as might be considered to be an oligomer, to very high molecular weights. The weight-average molecular weight may range from about 2,000 Da to about 20,000,000 Da, more particularly from about 10,000 Da to about 10,000,000 Da, and yet more particularly from about 50,000 Da to about 5,000,000 Da. Ranges in molecular weight can be achieved using methods known to one skilled in the art, and using the method provided herein.

Polymer Polymerization Method

Polymerization methods known to one skilled in the art may be employed to create the polymers described herein. The polymerization may be step-growth polymerization or chain-growth polymerization. Examples of chain-growth polymerization include those by radical, anionic, cationic, and coordination polymerization mechanisms. These polymerizations may proceed via solution, suspension, emulsion, inverse emulsion, or precipitation processes. For example, radical polymerization may be performed by solution, emulsion, or suspension processes, and ionic polymerization may be performed in solution, e.g., non-aqueous solution.

As mentioned, free radical polymerization is one polymerization method, which may be attractive when using water-dispersible and/or water-soluble reaction solvent(s), and is described in "Decomposition Rate of Organic Free Radical Polymerization" by K. W. Dixon (section II in Polymer Handbook, volume 1, 4th edition, Wiley-Interscience, 1999), which is incorporated by reference. Another description of the free-radical polymerization process is given in U.S. Pat. No. 2,882,262. Other polymerization methods, such as emulsion polymerization, suspension polymerization, gel polymerization, bead polymerization, and powder polymerization, also may be employed based on considerations such as final polymer form and ease of production.

The reaction may be carried out for times ranging up to 48 hours or even more, and may depend upon factors that include (1) the reactivity of the reactants, (2) the number of reactive groups, since one or more of the reactants may have more than one reactive group, (3) steric hindrance surrounding any reactive site, (4) the reaction temperature employed, (5) the presence or absence of a solvent, and (6) the use or non-use of an initiator and/or catalyst. With the use of an optional reaction solvent or solvents, the solvent(s) may be removed after the reaction, e.g., at reduced pressure and/or elevated temperature, and then to add a different solvent conducive to the final formulation.

For solution reactions, temperatures may be conveniently controlled by judicious choice of solvents within an appropriate boiling range. A reaction system's temperature is only limited in as much as not to cause substantial decomposition of the reactants or solvent. In practice, a wide range in temperatures is possible. For example, temperatures can vary from about 25° C. to about 225° C., such as from 30° C. to about 180° C., and such as from 50° C. to about 120° C. Reaction times for solvent reaction range from several minutes to 48 hours or more. Higher reaction temperatures and highly reactive reactants may reduce time for conversion to the desired product(s). In some aspects of the invention, solvent reaction times may be between 15 minutes and 8 hours and may range between 15 minutes and 4 hours. In addition, azeotropic water removal (when possible) from the solvent may facilitate solvent reactions.

It has been discovered that the branched polymers also may be produced by the following procedure:

A. Selecting at least one monomer having an electron-rich vinyl moiety, at least one monomer having an electron-poor vinyl moiety, a multifunctional branching agent comprising a di-N-vinyl urea moiety, and a solvent (or a solvent blend) in which the monomers are soluble or miscible, B. Charging a quantity of the solvent (or solvent blend) into a reactor, and, optionally, with a quantity of one or more of monomers C. Heating the reactor to a temperature from about 25° C. to a temperature less than a decomposition temperature of any monomer or boiling point of solvent (or solvent blend), D. Introducing a feed comprising one or more initiators, at least one of said multifunctional branching agents, and optionally, one or more monomers having an electron-rich vinyl group, one or more monomers having an electron-poor vinyl group, and/or solvent (or solvent blend) in which said monomers are soluble or miscible with the provision that by step (F.) the polymerization product precipitates from the solvent (or solvent blend), E. Polymerizing the monomers and the multifunctional branching agent, and F. Discharging from said reactor a polymer substantially precipitated from said solvent (or solvent blend).

It may be beneficial or desirable to remove any amount of unreacted reactant and/or side product from the final reaction product using methods known in the art.

Unlike other polymerization methods, the method summarized above was discovered to produce branched polymers that retain a measure of solubility (i.e., not fully crosslinked). This method introduces the initiator(s) and branching agent(s) after the reactor has been heated, and does not place them in the reactor heel. The term "introduce" refers to any technique of adding the materials to the reactor, for example, by adding the materials as one or more discrete charges ("shots") or as continuous flow (as by a pump).

In particular aspects, it may be desirable to charge a quantity of solvent (or solvent blend) and one or more (A) monomers into the reactor heel (Step B), and to separately introduce one or more of the (B) monomer(s), one or more initiators, and solvent (or solvent blend) (Step D). This aspect may be useful when any of the polymerization components [including monomer(s), initiator(s), solvent(s)] exhibits a potential for side reactions, as is the case with methyl vinyl ether, maleic anhydride, decanoyl peroxide, and acetone. However, this particular aspect is optional, and may not be useful for other combinations of reactants, such as non-polar solvents and monomers that are not water-sensitive.

A further aspect of the polymerization method results when the solvent (or solvent blend) is a non-solvent for the polymerization product, i.e., the branched polymer precipitates when discharged from the reactor. In one instance, a non-solvent is employed for the polymerization (such as ethyl acetate and cyclohexane in equal weight ratio is for methyl vinyl ether/maleic anhydride polymer branched with DVI). Alternatively, a good solvent may be used initially, and then a non-solvent added in progressively increasing amounts such that the final solvent blend is a non-solvent for the branched polymer product. An example of this solvent gradient approach for methyl vinyl ether/maleic anhydride polymer branched with DVI is charging acetone to the reactor heel, and then introducing cyclohexane during Step 4.

The term "non-solvent" used above refers to solvents for which polymer-polymer interactions exceed polymer-solvent interactions. The expansion coefficient, a, expressed in equation 1 may be employed, but this time non-solvents are those solvents for which a is less than unity (relative to a theta solvent). More specifically and without limitations, the polymer chemist may regard non-solvents are those solvents that do not produce optically clear polymer solutions. Non-solvents may produce hazy, cloudy, or turbid polymer suspensions (although they commonly may be called "solutions"), dispersions, and/or slurries that suspend or even precipitate the polymer to the walls and bottom of the reactor.

Compounds capable of initiating the free-radical addition polymerization include those materials known to function in the prescribed manner, and include the peroxo and azo classes of materials. Examples of peroxo and azo compounds include, but are not limited to: acetyl peroxide; azo bis-(2-amidinopropane)dihydrochloride; azo bis-isobutyronitrile (AIBN); 2,2'-azo bis-(2-methylbutyronitrile); benzoyl peroxide; di-tert-amyl peroxide; di-tert-butyl diperphthalate; butyl peroctoate; tert-butyl dicumyl peroxide; tert-butyl hydroperoxide; tert-butyl perbenzoate; tert-butyl permaleate; tert-butyl perisobutylrate; tert-butyl peracetate; tert-butyl perpivalate; para-chlorobenzoyl peroxide; cumene hydroperoxide; diacetyl peroxide; dibenzoyl peroxide; dicumyl peroxide; didecanoyl peroxide; dilauroyl peroxide; diisopropyl peroxodicarbamate; dioctanoyl peroxide; lauroyl peroxide; octanoyl peroxide; succinyl peroxide; and bis-(ortho-toluoyl) peroxide.

Suitable to initiate the free-radical polymerization, e.g., in water-based systems, are initiator mixtures or redox initiator systems, including: ascorbic acid/iron(II) sulfate/sodium peroxodisulfate, tert-butyl hydroperoxide/sodium disulfite, and tert-butyl hydroperoxide/sodium hydroxymethanesulfinate.

A chain transfer agent optionally may be used to control the polymer's molecular weight, molecular weight distribution, and/or branching character. As a skilled artisan can appreciate, typically, the chain transfer agent becomes part of the polymer.

The chain transfer agent may be of the kind that has a carbon-sulfur covalent bond. The carbon-sulfur covalent bond has usually absorption peak in a wave number region ranging from 500 cm$^{-1}$ to 800 cm$^{-1}$ in an infrared absorption spectrum. When the chain transfer agent is incorporated into the polymer, the absorption peak of the product may be changed in comparison to product made without a chain transfer agent.

Exemplary chain transfer agents include, but are not limited to, n-C3-15 alkylmercaptans such as n-propylmercaptan, n-butylmercaptan, n-amylmercaptan, n-hexylmercaptan, n-heptylmercaptan, n-octylmercaptan, n-nonylmercaptan, n-decylmercaptan, and n-dodecylmercaptan; branched alkylmercaptans such as isopropylmercaptan, isobutylmercaptan, s-butylmercaptan, tert-butylmercaptan, cyclohexylmercaptan, tert-hexadecylmercaptan, tert-laurylmercaptan, tert-nonylmercaptan, tert-octylmercaptan, and tert-tetradecylmercaptan; aromatic ring-containing mercaptans such as allylmercaptan, 3-phenylpropylmercaptan, phenylmercaptan, and mercaptotriphenylmethane. As a skilled artisan understands, the term -mercaptan and -thiol may be used interchangeably to mean C—SH group.

Typical examples of such chain transfer agents also include, but are not limited to, dodecanethiol, butanethiol, isooctyl-3-mercaptopropionate, 2-methyl-5-tert-butyl-thiophenol, carbon tetrachloride, carbon tetrabromide, aldehydes (such as acetaldehyde) and the like. Exemplary chain transfer agents include, but are not limited to, 2-mercaptoethanol, dodecanethiol, and carbon tetrabromide. One or more chain transfer agents may be introduced to the reactor after it is heated.

Based on total weight of the monomers to be polymerized, the chain transfer agent may generally be present in an amount from about 0.1% to about 7%, including from about 0.5% to about 6%, and from about 1.0% to about 5%, although it may be present in greater or lesser amounts.

The polymers according to the invention may be prepared according to the Examples set out below, which are presented for purposes of demonstrating, but not limiting, the preparation of the compounds and compositions of this invention.

EXAMPLES

Method 1

Polymerization Method

A 1-L Parr reactor was charged with solvent (or solvent blend) which then was sealed, agitation initiated, and purged with nitrogen five times. Then, methyl vinyl ether (MVE) was charged to the reactor, and the reactor was heated to 70° C., and then maleic anhydride (MA) was added for the next 3 hours (unless otherwise noted). At this time a stock solution was prepared containing decanoyl peroxide (DCP) (initiator), 1,3-di-N-vinyl imidazole (DVI), and additional solvent (or solvent blend). Fifteen minutes after the MA feed was begun, the stock solution was fed to the reactor at a constant rate and then stopped once MA feed was complete (which could take up to three hours or more). The reaction temperature of 70° C. was maintained for an additional 1 hour, and then the reactor temperature was returned to room temperature (about 20° C.) before discharging the polymer product.

When molecular weight was measured, a sample was prepared as a 0.15% solution of polymer with the GPC mobile phase. The solution was pre-filtered through a 0.45 µm Millex HV filter and injected into the GPC system as summarized below. A Shodex degasser and Waters instrumentation with Empower 2 software was used. The mass recovery of samples after GPC analysis represented the branched content of polymers.

| parameter | specification |
| --- | --- |
| columns | Shodex ® SB 806MHQ, SB-G (guard column) |
| flow rate | 0.5 mL/min |
| mobile phase | aqueous pH 9 with 0.2M LiNO$_3$, 0.1M Tris |
| injection volume | 100 µL |
| detector | differential refractive index |
| standards | poly(ethylene oxide) and poly(ethylene glycol), injected in the beginning and end of the sample analysis |
| filters | Millex ® HV 0.45 µm |
| run time | 35 minutes |

When the Brookfield viscosity ($\eta_{Brookfield}$) was measured, the synthesized polymer first was diluted to a target of 4.0% (w/w) solids in deionized water to hydrolyze the anhydride group, and then neutralized using sodium hydroxide such that the final target solids was 4.0% (w/w). Due to slight variations in the neutralization step, the actual solids for the Brookfield measurements ranged from about 4.0% (w/w) to about 4.5% (w/w). The Brookfield spindle was selected to ensure the torque reading at 100 rpm was greater than 10%.

When GPC recovery was measured, it was with respect to the particular polymer dissolved in the GPC mobile phase, e.g., aqueous pH 9 with 0.2 M LIN0$_3$, 0.1 M Tris. GPC recovery refers to the polymer sample mass recovery relative to a control linear polymer (i.e., the linear analogue made without any branching agent) measured using the same GPC parameters. GPC recovery was calculated using the equation:

$$GPC\ Recovery = \frac{C_{control}}{C_{sample}} \times \frac{A_{control}}{A_{sample}} \times 100,$$

wherein Control is the concentration of the control, linear polymer; $C_{sample}$ is the concentration of the branched polymer sample; $A_{control}$ is the peak area of the control, linear polymer; and $A_{sample}$ is the peak area of the branched polymer sample.

Example 1

MA/MVE Polymer Branched by DVI in Acetone

Method 1 was employed to produce MA/MVE polymer branched by DVI in acetone. For this synthesis, 53 g of MVE, 60 g of MA, 0.02 g of DVI, and 0.47 g of DCP were used to create of polymer having 50 mol % MVE, 49.99 mol % MA, and 0.01 mol %(or 250 ppm) DVI.

The discharged polymer contained 29.0% solids. $M_w$ was 806,000 Da, and $M_n$ was 166,000 Da, giving a PDI of 4.86. GPC recovery was 100%, suggesting negligible or zero crosslinked/gel content, $\eta_{Brookfield}$ was 7,950 cP.

Example 2

MA/MVE Polymer Branched by DVI in Acetone

Method 1 was employed to produce MA/MVE polymer branched by DVI in acetone. For this synthesis, 53 g of MVE, 60 g of MA, 0.05 g of DVI, and 0.47 g of DCP were used to create of polymer having 50 mol % MVE, 49.97 mol % MA, and 0.03 mol % (or 500 ppm) DVI.

The discharged polymer contained 29.0% solids, $M_w$ was 329,000 Da, and $M_n$ was 78,900 Da, giving a PDI of 4.17. GPC recovery was 100%, suggesting negligible or zero crosslinked/gel content, and $\eta_{Brookfield}$ was 2,560 cP.

Example 3

MA/MVE Polymer Branched by DVI in Acetone

Method 1 was employed to produce MA/MVE polymer branched by DVI in acetone. For this synthesis, 71 g of MVE, 60 g of MA, 0.07 g of DVI, and 0.63 g of DCP were used to create of polymer having 50 mol % MVE, 49.96 mol % MA, and 0.04 mol % (or 750 ppm) DVI.

The discharged polymer contained 24.0% solids, $M_w$ was 484,000 Da, and $M_n$ was 94,700 Da, giving a PDI of 5.11. GPC recovery was 100%, suggesting negligible or zero crosslinked/gel content, and $\eta_{Brookfield}$ was 3,960 cP.

Example 4

MA/MVE Polymer Branched by DVI in Acetone

Method 1 was employed to produce MA/MVE polymer branched by DVI in acetone. For this synthesis, 58 g of MVE, 65 g of MA, 0.08 g of DVI, and 0.51 g of DCP were used to create of polymer having 50 mol % MVE, 49.96 mol % MA, and 0.04 mol % (or 750 ppm) DVI.

The discharged polymer contained 19.0% solids, $M_w$ was 339,800 Da, and $M_n$ was 154,100 Da, giving a PDI of 2.20. GPC recovery was 100%, suggesting negligible or zero crosslinked/gel content, and $\eta_{Brookfield}$ was 2,560 cP.

Example 5

MA/MVE Polymer Branched by DVI in Acetone

Method 1 was employed to produce MA/MVE polymer branched by DVI in acetone. For this synthesis, 42 g of MVE, 47 g of MA, 0.06 g of DVI, and 0.37 g of DCP were used to create of polymer having 50 mol % MVE, 49.96 mol % MA, and 0.04 mol % (or 750 ppm) DVI.

The discharged polymer contained 14.0% solids, $M_w$ was 505,000 Da, and $M_n$ was 113,000 Da, giving a PDI of 4.47. GPC recovery was 100%, suggesting negligible or zero crosslinked/gel content, and $\eta_{Brookfield}$ was 1,320 cP.

Example 6

MA/MVE Polymer Branched by DVI in Acetone

Method 1 was employed to produce MA/MVE polymer branched by DVI in acetone. For this synthesis, 71 g of MVE, 60 g of MA, 0.07 g of DVI, and 0.63 g of DCP were used to create of polymer having 50 mol % MVE, 49.96 mol % MA, and 0.04 mol % (or 750 ppm) DVI.

The discharged polymer contained 24.0% solids, $M_w$ was 357,000 Da, and $M_n$ was 107,000 Da, giving a PDI of 3.34. GPC recovery was 100%, suggesting negligible or zero crosslinked/gel content, and $\eta_{Brookfield}$ was 6,280 cP.

Example 7

MA/MVE Polymer Branched by DVI in Acetone

Example 6 was repeated.

The discharged polymer contained 24.0% solids, $M_w$ was 345,000 Da, and $M_n$ was 122,000 Da, giving a PDI of 2.83. GPC recovery was 100%, suggesting negligible or zero crosslinked/gel content, and $\eta_{Brookfield}$ was 130,000 cP.

Example 8

MA/MVE Polymer Branched by DVI in Acetone

Method 1 was employed to produce MA/MVE polymer branched by DVI in acetone. For this synthesis, 58 g of MVE, 65 g of MA, 0.08 g of DVI, and 0.51 g of DCP were used to create of polymer having 50 mol % MVE, 49.96 mol % MA, and 0.04 mol % (or 750 ppm) DVI.

The discharged polymer contained 19.0% solids, $M_w$ was 1,080,000 Da, and $M_n$ was 280,000 Da, giving a PDI of 3.86. GPC recovery was 100%, suggesting negligible or zero crosslinked/gel content, and $\eta_{Brookfield}$ was 18,600 cP.

Example 9

MA/MVE Polymer Branched by DVI in Acetone

Method 1 was employed to produce MA/MVE polymer branched by DVI in acetone. For this synthesis, 71 g of MVE, 60 g of MA, 0.07 g of DVI, and 0.63 g of DCP were used to create of polymer having 50 mol % MVE, 49.96 mol % MA, and 0.04 mol % (or 750 ppm) DVI.

The discharged polymer contained 29.0% solids, $M_w$ was 893,000 Da, and $M_n$ was 153,000 Da, giving a PDI of 5.84. GPC recovery was 100%, suggesting negligible or zero crosslinked/gel content, and $\eta_{Brookfield}$ was 17,200 cP.

Example 10

MA/MVE Polymer Branched by DVI in Acetone

Example 9 was repeated.

The discharged polymer contained 24.1% solids, $M_w$ was 587,000 Da, and $M_n$ was 129,000 Da, giving a PDI of 4.55. GPC recovery was 100%, suggesting negligible or zero crosslinked/gel content, and $\eta_{Brookfield}$ was 3,100 cP.

Example 11

MA/MVE Polymer Branched by DVI in Acetone

Method 1 was employed to produce MA/MVE polymer branched by DVI in acetone. For this synthesis, 53 g of MVE, 60 g of MA, 0.07 g of DVI, and 0.47 g of DCP were used to create of polymer having 50 mol % MVE, 49.96 mol % MA, and 0.04 mol % (or 750 ppm) DVI.

The discharged polymer contained 24.1% solids, $M_w$ was 814,000 Da, and $M_n$ was 167,000 Da, giving a PDI of 4.87. GPC recovery was 100%, suggesting negligible or zero crosslinked/gel content, and $\eta_{Brookfield}$ was 15,400 cP.

Example 12

MA/MVE Polymer Branched by DVI in Acetone

Method 1 was employed to produce MA/MVE polymer branched by DVI in acetone. For this synthesis, 53 g of MVE, 60 g of MA, 0.07 g of DVI, and 0.24 g of DCP were used to create of polymer having 50 mol % MVE, 49.96 mol % MA, and 0.04 mol % (or 750 ppm) DVI.

The discharged polymer contained 29.0% solids, $M_w$ was 1,390,000 Da, and $M_n$ was 242,000 Da, giving a PDI of 5.74. GPC recovery was 100%, suggesting negligible or zero crosslinked/gel content, and $\eta_{Brookfield}$ was 35,000 cP.

Example 13

MA/MVE Polymer Branched by DVI in Acetone

Method 1 was employed to produce MA/MVE polymer branched by DVI in acetone. For this synthesis, 53 g of MVE, 60 g of MA, 0.07 g of DVI, and 0.1 g of DCP were used to create of polymer having 50 mol % MVE, 49.96 mol % MA, and 0.04 mol % (or 750 ppm) DVI.

The discharged polymer contained 29.1% solids, $M_w$ was 1,330,000 Da, and $M_n$ was 220,000 Da, giving a PDI of 6.05. GPC recovery was 100%, suggesting negligible or zero crosslinked/gel content, and $\eta_{Brookfield}$ was 17,200 cP.

Example 14

MA/MVE Polymer Branched by DVI from Cyclohexane/Ethyl Acetate

Method 1 was employed to produce MA/MVE polymer branched by DVI from a blend of cyclohexane and ethyl acetate (in equal mass ratio). For this synthesis, 47 g of MVE, 40 g of MA, 0.05 g of DVI, and 0.32 g of DCP were used to create of polymer having 50 mol % MVE, 49.95 mol % MA, and 0.05 mol % (or 800 ppm) DVI.

The polymer was discharged from the reactor as a slurry (a blend of cyclohexane and ethyl acetate in equal mass ratio does not dissolve MA/MVE polymer) and the slurry contained 14.0% solids. $M_w$ was 572,580 Da, and $M_n$ was 135,682 Da, giving a PDI of 4.22. GPC recovery was 99%, suggesting negligible or zero crosslinked/gel content, and $\eta_{Brookfield}$ was about 1 cP.

Example 15

MA/MVE Polymer Branched by DVI in Acetone

Method 1 was employed to produce MA/MVE polymer branched by DVI in acetone. For this synthesis, 53 g of MVE, 60 g of MA, 0.14 g of DVI, and 0.50 g of DCP were used to create of polymer having 50 mol % MVE, 49.92 mol % MA, and 0.08 mol % (or 1,500 ppm) DVI.

The discharged polymer contained 29.0% solids, $M_w$ was 896,000 Da, and $M_n$ was 111,000 Da, giving a PDI of 8.07. GPC recovery was 100%, suggesting negligible or zero crosslinked/gel content, and $\eta_{Brookfield}$ was 14,500 cP.

Example 16

MA/MVE Polymer Branched by DVI from Cyclohexane/Ethyl Acetate

Method 1 was employed to produce MA/MVE polymer branched by DVI from a blend of cyclohexane and ethyl acetate (in equal mass ratio). For this synthesis, 47 g of MVE, 40 g of MA, 0.10 g of DVI, and 0.32 g of DCP were used to create of polymer having 50 mol % MVE, 49.92 mol % MA, and 0.08 mol % (or 1,500 ppm) DVI.

The discharged polymer contained 14.0% solids, $M_w$ was 606,172 Da, and $M_n$ was 151,543 Da, giving a PDI of 4.0. GPC recovery was 92%, suggesting about 8% (by weight) crosslinked/gel content, and $\eta_{Brookfield}$ was about 30 cP.

Example 17

MA/MVE Polymer Branched by DVI from Cyclohexane/Ethyl Acetate

Method 1 was employed to produce MA/MVE polymer branched by DVI from a blend of cyclohexane and ethyl acetate (in equal mass ratio). For this synthesis, 62 g of MVE, 70 g of MA, 0.28 g of DVI, and 0.55 g of DCP were used to create of polymer having 50 mol % MVE, 49.87 mol % MA, and 0.13 mol % (or 2,500 ppm) DVI.

Example 18

MA/MVE Polymer Branched by DVI in Acetone

Method 1 was employed to produce MA/MVE polymer branched by DVI in acetone. For this synthesis, 72 g of MVE, 80 g of MA, 0.39 g of DVI, and 0.63 g of DCP were used to create of polymer having 50 mol % MVE, 49.84 mol % MA, and 0.16 mol % (or 3,000 ppm) DVI.
The discharged polymer contained 29.1% solids, $M_w$ was 2,360,000 Da, and $M_n$ was 184,000 Da, giving a PDI of 12.82. GPC recovery was 100%, suggesting negligible or zero crosslinked/gel content, and $\eta_{Brookfield}$ was 271,000 cP.

Example 19

MA/MVE Polymer Branched by DVI from Cyclohexane/Ethyl Acetate

Method 1 was employed to produce MA/MVE polymer branched by DVI from a blend of cyclohexane and ethyl acetate (in equal mass ratio). For this synthesis, 47 g of MVE, 40 g of MA, 0.22 g of DVI, and 0.32 g of DCP were used to create of polymer having 50 mol % MVE, 49.82 mol % MA, and 0.18 mol % (or 3,500 ppm) DVI.
The polymer was discharged as a slurry containing 13.9% solids, $M_w$ was 957,170 Da, and $M_n$ was 204,087 Da, giving a PDI of 4.69. GPC recovery was 91%, suggesting about 9% (by weight) crosslinked/gel content.

Example 20

MA/MVE Polymer Branched by DVI from Cyclohexane/Ethyl Acetate

Method 1 was employed to produce MA/MVE polymer branched by DVI from a blend of cyclohexane and ethyl acetate (in equal mass ratio). For this synthesis, 62 g of MVE, 70 g of MA, 0.50 g of DVI, and 0.55 g of DCP were used to create of polymer having 50 mol % MVE, 49.76 mol % MA, and 0.24 mol % (or 4,500 ppm) DVI.
The polymer was discharged as a slurry containing 24.1% solids.

Example 21

MA/MVE Polymer Branched by DVI in Acetone

Method 1 was employed to produce MA/MVE polymer branched by DVI in acetone. For this synthesis, 72 g of MVE, 80 g of MA, 0.77 g of DVI, and 0.63 g of DCP were used to create of polymer having 50 mol MVE, 49.68 mol % MA, and 0.32 mol % (or 6,000 ppm) DVI.
The discharged polymer contained 29.1% solids, $M_w$ was 2,560,000 Da, and $M_n$ was 284,000 Da, giving a PDI of 9.01. GPC recovery was 86%, suggesting about 14% (by weight) crosslinked/gel content, and $\eta_{Brookfield}$ was 721,000 cP.

Example 22

MA/MVE Polymer Branched by DVI from Cyclohexane/Ethyl Acetate

Method 1 was employed to produce MA/MVE polymer branched by DVI from a blend of cyclohexane and ethyl acetate (in equal mass ratio). For this synthesis, 47 g of MVE, 40 g of MA, 0.38 g of DVI, and 0.32 g of DCP were used to create of polymer having 50 mol % MVE, 49.68 mol % MA, and 0.32 mol % (or 6,000 ppm) DVI.
The polymer was discharged as a slurry containing 14.1% solids, $M_w$ was 698,450 Da, and $M_n$ was 64,078 Da, giving a PDI of 10.90. GPC recovery was 59%, suggesting about 41% (by weight) crosslinked/gel content.

Example 23

MA/MVE Polymer Branched by DVI from Cyclohexane/Ethyl Acetate

Method 1 was employed to produce MA/MVE polymer branched by DVI from a blend of cyclohexane and ethyl acetate (in equal mass ratio). For this synthesis, 47 g of MVE, 40 g of MA, 0.57 g of DVI, and 0.32 g of DCP were used to create of polymer having 50 mol % MVE, 49.52 mol % MA, and 0.48 mol % (or 9,000 ppm) DVI.
The polymer was discharged as a slurry containing 14.4% solids, $M_w$ was 494,510 Da, and $M_n$ was 65,000 Da, giving a PDI of 7.61. GPC recovery was 40%, suggesting about 60% (by weight) crosslinked/gel content.

Example 24

MA/MVE Polymer Branched by DVI in Acetone

Method 1 was employed to produce MA/MVE polymer branched by DVI in acetone. For this synthesis, 71 g of MVE, 80 g of MA, 1.53 g of DVI, and 0.64 g of DCP were used to create of polymer having 50 mol % MVE, 49.36 mol % MA, and 0.64 mol % (or 12,000 ppm) DVI.
The discharged polymer contained 29.2% solids, $M_w$ was 815,000 Da, and $M_n$ was 134,000 Da, giving a PDI of 6.08. GPC recovery was 37%, suggesting about 63% (by weight) crosslinked/gel content, and $\eta_{Brookfield}$ was 83,600 cP.

Example 25

MA/MVE Polymer Branched by DVI in Acetone

Method 1 was employed to produce MA/MVE polymer branched by DVI in acetone. For this synthesis, 71 g of MVE, 80 g of MA, 1.63 g of DVI, and 0.64 g of DCP were used to create of polymer having 50 mol % MVE, 49.36 mol % MA, and 0.64 mol % (or 12,000 ppm) DVI.
The discharged polymer contained 29.2% solids, $M_w$ was 1,140,000 Da, and $M_n$ was 171,000 Da, giving a PDI of 6.66. GPC recovery was 30%, suggesting about 70% (by weight) crosslinked/gel content, and $\eta_{Brookfield}$ was 1,550,000 cP.

Example 26

MA/MVE Polymer Branched by DVI from Cyclohexane/Ethyl Acetate

Method 1 was employed to produce MA/MVE polymer branched by DVI from a blend of cyclohexane and ethyl acetate (in equal mass ratio). For this synthesis, 47 g of MVE, 40 g of MA, 0.90 g of DVI, and 0.33 g of DCP were used to create of polymer having 50 mol % MVE, 49.25 mol % MA, and 0.75 mol % (or 14,000 ppm) DVI.
The polymer was discharged as a slurry containing 14.8% solids.

Comparative Example

MA/MVE Copolymer from Acetone

Method 1 was substantially followed to produce a control MA/MVE copolymer from acetone, but without any DVI branching agent. For this synthesis 53 g of MVE, 60 g of MA, and 0.47 g of DCP were used in acetone. This alternating copolymer theoretically contained the two monomers in equal molar amounts.

The discharged product contained 28.9% polymer solids, the weight-average molecular weight ($M_w$) was 389,000 Da, and the number-average molecular weight ($M_n$) was 92,000 Da. GPC recovery was 100%, suggesting negligible or zero crosslinked/gel content, and $\eta_{Brookfield}$ was 2,330 cP.

Figure 2:
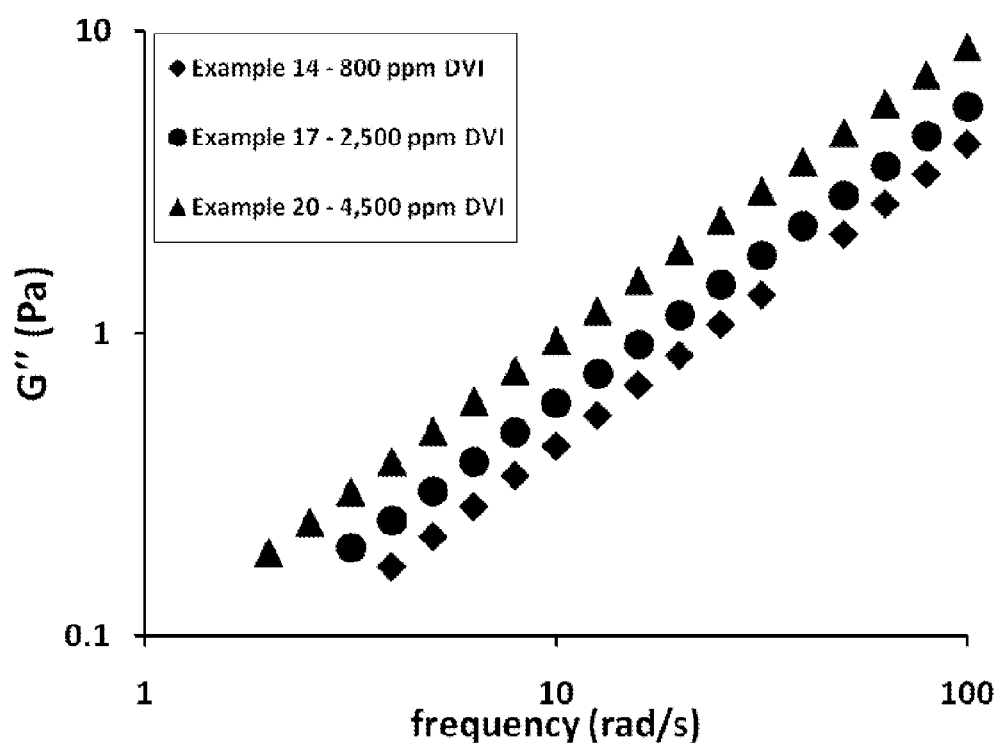
FIG. 2 is a graph of G" as a function of frequency measured in accordance with Example 27.
Figure 3:
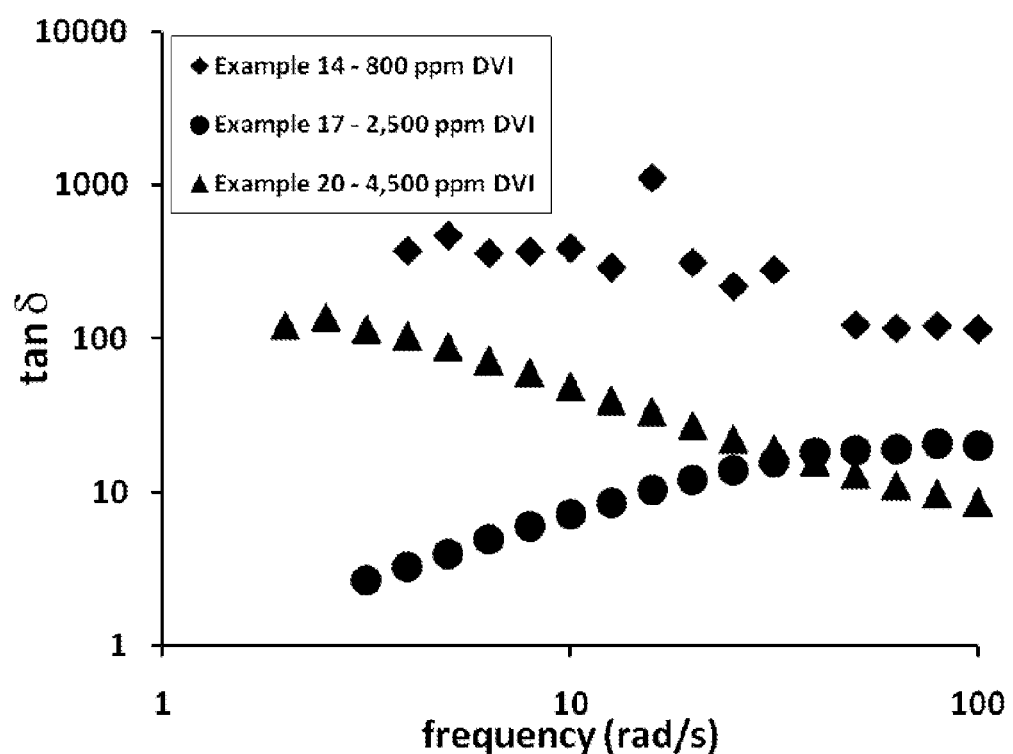
FIG. 3 is a graph of tan δ as a function of frequency measured in accordance with Example 27.

Table 3 summarizes some of the features of Examples 1-26 and the Comparative Example.

solubility in this Example. Values of G' ranged from about 0.0004 Pa to about 0.7 Pa (or from about 0.004 dynes/cm$^2$ to about 7 dynes/cm$^2$) over the range from about 1 rad/s to about 100 rad/s (FIG. 1). The soluble, branched polymers also exhibit a G" that is dependent on the applied frequency, ranging from about 0.2 Pa to about 9 Pa (or from about 2 dynes/cm$^2$ to about 90 dynes/cm$^2$) over the range from about 1 rad/s to about 100 rad/s (FIG. 2). Consequently, tan δ, the ratio of G' divided by G", is greater than 1 over this same range in frequency (FIG. 3). In some aspects, polymers of the invention have a value of tan δ greater than about 5, and more particularly greater than about 10.

When considered in their totality, these properties are consistent with the understanding that polymers of the invention comprise branched portions and do not exhibit substantial storage. In this context, "substantial storage" means having a minimum value of G' greater than 100 Pa (or 1000 dynes/

TABLE 3

Summary of some features from Examples 1-26 and the Comparative Example.

| Example | DVI in polymer (ppm) | solid content of polymerization product (w/w) | $M_w$ (Da) | $M_n$ (Da) | polymer's soluble content* (w/w) | $\eta_{Brookfield}$ (cP) |
|---|---|---|---|---|---|---|
| Comp. Example | 0 | 28.9% | 389,000 | 92,000 | 100% | 2,330 |
| 1 | 250 | 29.0% | 806,000 | 166,000 | 100% | 7,950 |
| 2 | 500 | 29.0% | 329,000 | 78,900 | 100% | 2,560 |
| 3 | 750 | 24.0% | 484,000 | 94,700 | 100% | 3,960 |
| 4 | 750 | 19.0% | 339,800 | 154,100 | 100% | — |
| 5 | 750 | 14.0% | 505,000 | 113,000 | 100% | 1,320 |
| 6 | 750 | 24.0% | 357,000 | 107,000 | 100% | 6,280 |
| 7 | 750 | 24.0% | 345,000 | 122,000 | 100% | 130,000 |
| 8 | 750 | 19.0% | 1,080,000 | 280,000 | 100% | 18,600 |
| 9 | 750 | 29.0% | 893,000 | 153,000 | 100% | 17,200 |
| 10 | 750 | 24.1% | 587,000 | 129,000 | 100% | 3,100 |
| 11 | 750 | 24.1% | 814,000 | 167,000 | 100% | 15,400 |
| 12 | 750 | 29.0% | 1,390,000 | 242,000 | 100% | 35,000 |
| 13 | 750 | 29.1% | 1,330,000 | 220,000 | 100% | 17,200 |
| 14 | 800 | 14.0% | 572,580 | 135,682 | 99% | — |
| 15 | 1,500 | 29.0% | 896,000 | 111,000 | 100% | 14,500 |
| 16 | 1,500 | 14% | 606,172 | 151,543 | 92% | — |
| 17 | 2,500 | 24.2% | — | — | 98% | — |
| 18 | 3,000 | 29.1% | 2,360,000 | 184,000 | 100% | 271,000 |
| 19 | 3,500 | 13.9% | 957,170 | 204,087 | 91% | — |
| 20 | 4,500 | 24.1% | — | — | 88% | — |
| 21 | 6,000 | 29.1% | 2,560,000 | 284,000 | 86% | 721,000 |
| 22 | 6,000 | 14.1% | 698,450 | 64,078 | 59% | — |
| 23 | 9,000 | 14.4% | 494,510 | 65,000 | 40% | — |
| 24 | 12,000 | 29.2% | 815,000 | 134,000 | 37% | 83,600 |
| 25 | 12,000 | 29.2% | 1,140,000 | 171,000 | 30% | 1,550,000 |
| 26 | 14,000 | 14.8% | — | — | 20% | — |

*Soluble content in the synthesized polymer is based on polymer mass recovery following GPC sample pretreatment (0.45 μm PVDF prefilter) and analysis.

Example 27

Measurement of G', G", and Tan δ

The storage modulus G', loss modulus G", and their ratio (tan δ) were measured for polymers described herein in the linear viscoelastic region using a 60 mm titanium cone and plate fixtures (AR-G2 Rheometer, TA Instruments). The branched MVE/MA copolymers contained 800, 2500, and 4500 ppm DVI (Examples 14, 17, and 20), and were evaluated at 2.5% (w/w) concentration in deionized water.

The values of G', G", and tan δ illustrate the soluble nature of these polymer, more specially (but not limited to) water cm2) and/or a value of tan δ less than 1, such as those taught in U.S. Pat. No. 5,202,112. In fact, the '112 patent states in column 7, lines 9-13, "the above-described polymers (of '112) must be cross-linked to be linearly viscoelastic. The polymers are lightly cross-linked so that they swell and form gels, strong three-dimensional networks in aqueous systems."

A further distinction between the polymers of the current invention and those of the '112 patent regards the polymer concentration in water used for these rheological measurements. In '112, the concentration was 1% (w/w). This addition level could not be employed presently because at that concentration the polymers do not exhibit sufficient storage (G') to allow reliable measurement of G' above the instrument's sensitivity.

Example 28

Measurement of Shear Viscosity

Viscosity profiles of the polymers from Examples 14 (800 ppm DVI), 17 (2,500 ppm DVI) and 20 (4,500 ppm DVI) were measured at 25° C. and 2.5% (w/w) concentration in deionized water via an m-VROC® capillary viscometer (RheoSense, Inc). As a control sample to the study, Gantrez® AN-139, which is a linear MVE/MA copolymer (Ashland Specialty Ingredients) made without any branching agent. Prior to testing, the samples were filtered using 5 μm PTFE filters (Millex® LS), because polymer portions removed by the filtered could hinder measurements.

Figure 4:
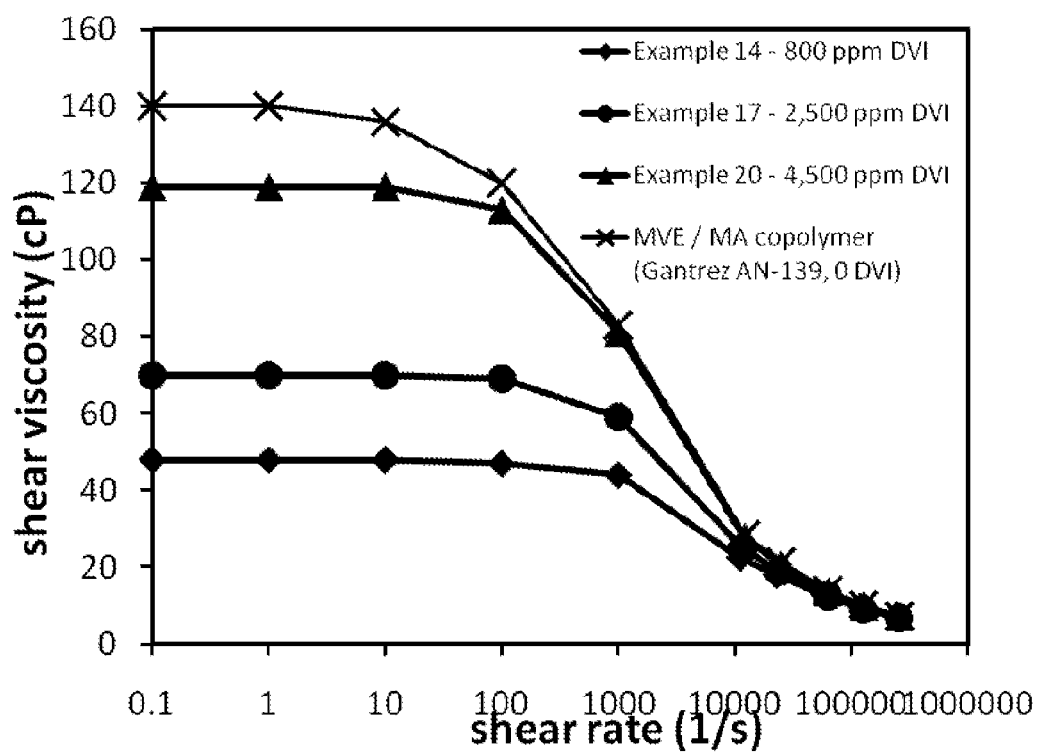
FIG. 4 is a graph of shear viscosity as a function of shear rate measured in accordance with Example 28.

All three branched polymers of the invention were found to have a lower shear viscosity than the linear polymer. Also, two viscosity regimes were noted in the measured values: Newtonian behavior wherein viscosity did not depend on shear rate (from $0.1\ s^{-1}$ to about $100\ s^{-1}$) followed by shear-thinning behavior (FIG. 4). Differences between the samples were more pronounced at low shear, wherein the Newtonian viscosities ranged from about 45 cP to about 120 cP. When considered together with molecular weight, the direct correlation between DVI content and the Newtonian viscosities suggests higher levels of the branching agent resulted in higher branching nature of the polymers. At the highest shear of $260,000\ s^{-1}$ the three branched polymers had the same shear viscosity of 7 cP.

We claim:

1. A branched polymer resulting from the polymerization of: (A) at least one monomer having an electron donor moiety, (B) at least one monomer having an electron acceptor moiety, and (C) at least one multifunctional branching agent comprising a urea moiety and at least two N-vinyl groups; wherein said monomer having an electron donor moiety is selected from the group consisting of: methyl vinyl ether, N-vinyl-2-pyrrolidone, isobutylene, and combinations thereof, and wherein said monomer having an electron acceptor moiety is maleic anhydride, and wherein said multifunctional branching agent is 1,3-divinyl imidazolidone; and wherein said polymer is methyl vinyl ether/maleic anhydride/1,3-divinyl imidazolidone polymer, isobutylene/maleic anhydride/1,3-divinyl imidazolidone polymer, methyl vinyl ether/N-vinyl-2-pyrrolidone/maleic anhydride/1,3-divinyl imidazolidone polymer, or isobutylene/maleic anhydride/N-vinyl-2-pyrrolidone/1,3-divinyl imidazolidone polymer.

2. The branched polymer according to claim 1 that is at least 20% (by weight) soluble in a solvent for which the corresponding polymer of equal molecular weight made without said multifunctional branching agent is at least 20% (by weight) soluble.

3. The branched polymer according to claim 1 having a frequency-dependent storage modulus (G'), a frequency-dependent loss modulus (G"), or frequency-dependent G' and G" over the range from about 1 rad/s to about 100 rad/s.

4. The branched polymer according to claim 1 for which G' divided by G" (i.e., tan δ) equal to or greater than 1.

5. The branched polymer according to claim 1 that is polymerized using up to about 14,000 ppm 1,3-divinyl imidazolidone.

* * * * *